(12) United States Patent
Ligouy

(10) Patent No.: US 6,907,719 B2
(45) Date of Patent: Jun. 21, 2005

(54) AGRICULTURAL IMPLEMENT COMPRISING A TRANSPORTING DEVICE

(75) Inventor: Jean-Baptiste Ligouy, Lugny-Champagne (FR)

(73) Assignee: Kuhn S.A., Saverne (FR)

( * ) Notice: Subject to any disclaimer, the term of this patent is extended or adjusted under 35 U.S.C. 154(b) by 16 days.

(21) Appl. No.: 10/445,336

(22) Filed: May 27, 2003

(65) Prior Publication Data

US 2003/0221401 A1 Dec. 4, 2003

(30) Foreign Application Priority Data

May 29, 2002 (FR) .......................................... 02 06610

(51) Int. Cl.[7] .............................................. A01D 34/24
(52) U.S. Cl. ...................................... 56/15.1; 56/15.5
(58) Field of Search ................................ 56/14.7, 14.9, 56/15.1, 15.2, 15.4, 15.5; 172/240, 244, 248, 246

(56) References Cited

U.S. PATENT DOCUMENTS

| | | | |
|---|---|---|---|
| 4,555,897 A | * 12/1985 | Degelman | 56/228 |
| 4,723,401 A | * 2/1988 | Webster et al. | 56/377 |
| 4,738,315 A | 4/1988 | Kinzenbaw | |
| 4,800,962 A | 1/1989 | Murray | |
| 4,934,131 A | 6/1990 | Frisk et al. | |
| 6,260,629 B1 | 7/2001 | Toth | |
| 6,328,327 B1 | 12/2001 | Ligouy | |

FOREIGN PATENT DOCUMENTS

FR 2 712 137 5/1995

* cited by examiner

Primary Examiner—Meredith Petravick
(74) Attorney, Agent, or Firm—Oblon, Spivak, McClelland, Maier & Neustadt, P.C.

(57) ABSTRACT

An agricultural machine comprises a body and a drawbar, which drawbar is connected to the body using a first articulation with a substantially vertical axis and allows the agricultural machine to be moved along during work and during transport, the body resting on the ground during work using wheels which are each connected to the body via at least one connecting element, the body comprising a central unit and a working unit, which working unit is arranged transversely to the direction of forward travel during work and is arranged substantially parallel to the direction of forward travel during transport. It is notable in that the working unit is connected to the central unit using a second articulation with a substantially vertical axis so that the working unit can be brought into a work position or into a transport position with respect to said central unit, and wherein the singular or plural connecting element allows (allow) the corresponding wheel(s) to be moved away from or closer to a vertical mid-plane of the body, the wheels being used during work and during transport.

26 Claims, 4 Drawing Sheets

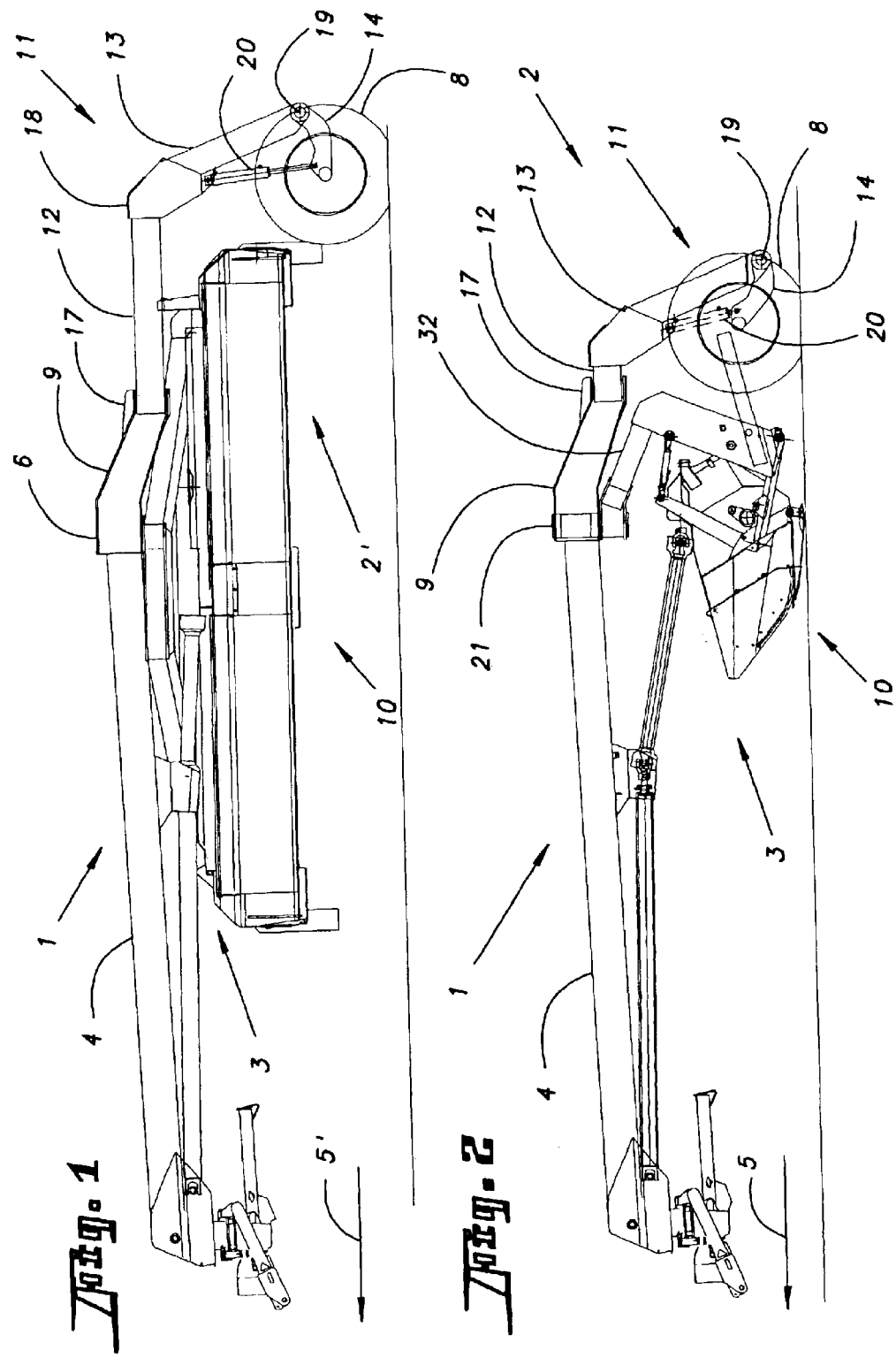

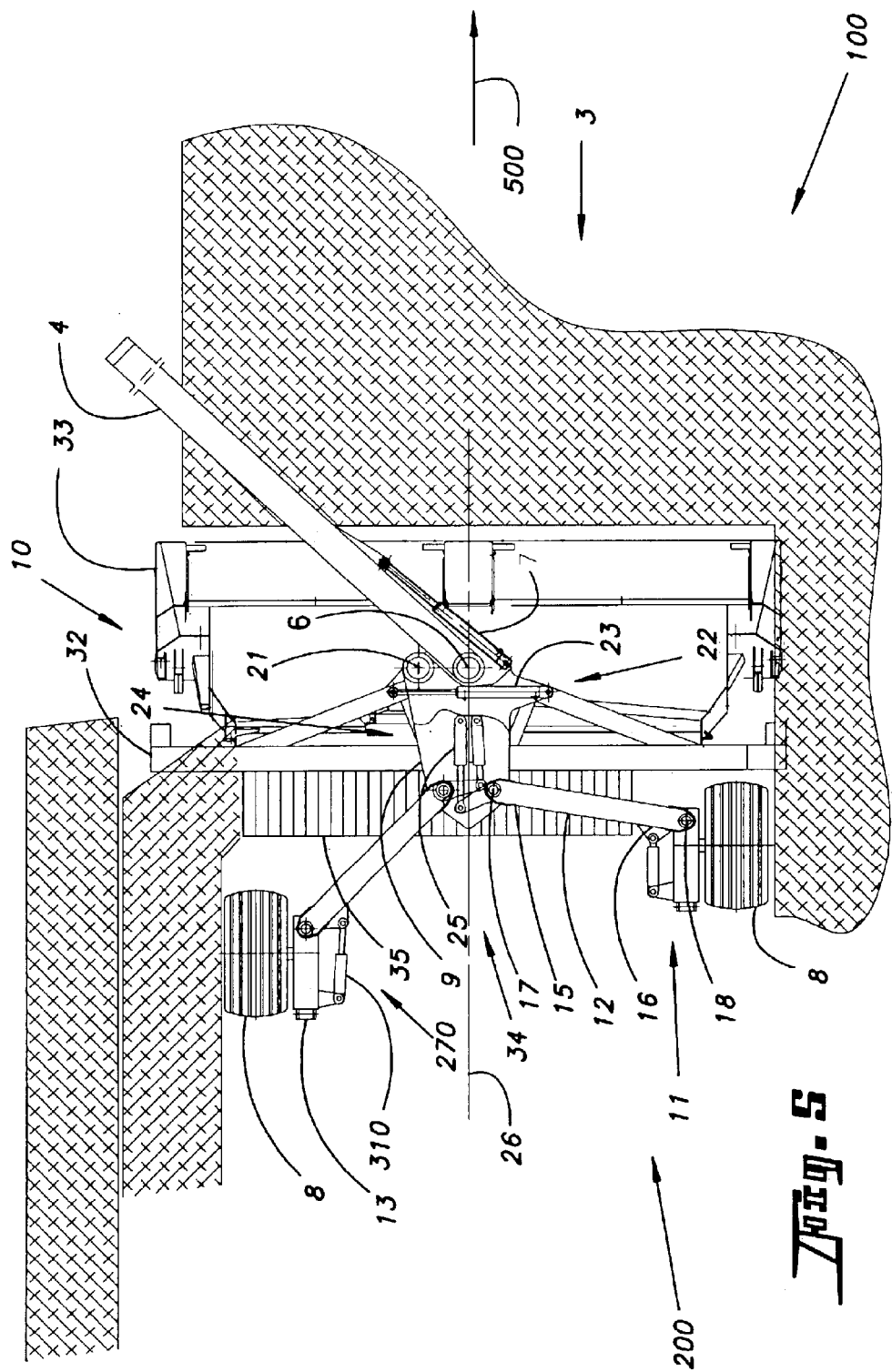

AGRICULTURAL IMPLEMENT COMPRISING A TRANSPORTING DEVICE

BACKGROUND OF THE INVENTION

1. Field of the Invention

The present invention relates to the general field of agricultural machinery. It relates to an agricultural machine comprising a body and a drawbar, which drawbar is connected to said body by means of a first articulation with a substantially vertical axis and allows said agricultural machine to be moved along during work and during transport, said body resting on the ground during work by means of wheels which are each connected to said body via at least one connecting means, said body comprising a central unit and a working unit, which working unit is arranged transversely to the direction of forward travel for work and is arranged substantially parallel to the direction of forward travel during transport.

2. Discussion of the Background

Such an agricultural machine is known from the prior art from the ALTERNA 500 mower-conditioner brochure. The applicant, KUHN S. A., manufactures and markets such an agricultural machine. This known machine is intended to be hitched to a tractor for work and for transport, it comprises a body equipped with a hitching drawbar. The body of the machine comprises a central unit and a working unit made up of two groups of working implements arranged respectively one on each side of the central unit. During work, the body rests on the ground by means of working wheels which are connected to said body by means of connecting rods. The two groups of working implements are arranged transversely to the direction of forward travel. For transport, said body rests on the ground by means of transport wheels, these differing from the work wheels. The transport wheels pivot about a respective horizontal articulation upon passing from the work position to the transport position. The groups of working implements are then arranged parallel to the direction of forward travel for transport.

As this mower-conditioner uses specific wheels for work and wheels intended solely for transport, it is therefore necessary for the machine to be equipped with an additional set of wheels for transport and with an equipment to pivot said transport wheels about the respective horizontal articulation to make them operational for transport. Said specific wheels for transport and the equipment pivoting said transport wheels increase on one hand the weight and on another hand the cost of such an agricultural machine.

SUMMARY OF THE INVENTION

It is an object of the present invention to overcome the aforementioned drawbacks. The present invention has in particular to allow an agricultural machine having a working width greater than the maximum width allowed for traffic by road to be converted easily from a work position to a transport position.

To this end, an important feature of the invention consists in the fact that the working unit is connected to the central unit by means of a second articulation with a substantially vertical axis so that the working unit can be brought into a work position or into a transport position with respect to said central unit, and in that said singular or plural connecting means allows (allow) the corresponding wheel(s) to be moved away from or closer to a vertical mid-plane of said body, said wheels being used during work and during transport.

BRIEF DESCRIPTION OF THE DRAWINGS

Other features and advantages of the invention will become apparent from the description hereinafter of some non-limiting exemplary embodiments of the invention, with reference to the attached drawings in which:

FIG. 1 depicts a side view of a machine according to the invention in the transport position;

FIG. 2 depicts a side view of the machine of FIG. 1 in the work position;

FIG. 5 depicts another exemplary embodiment of a machine according to the invention viewed from above and in another work position.

DESCRIPTION OF THE PREFERRED EMBODIMENT

Figure 3:
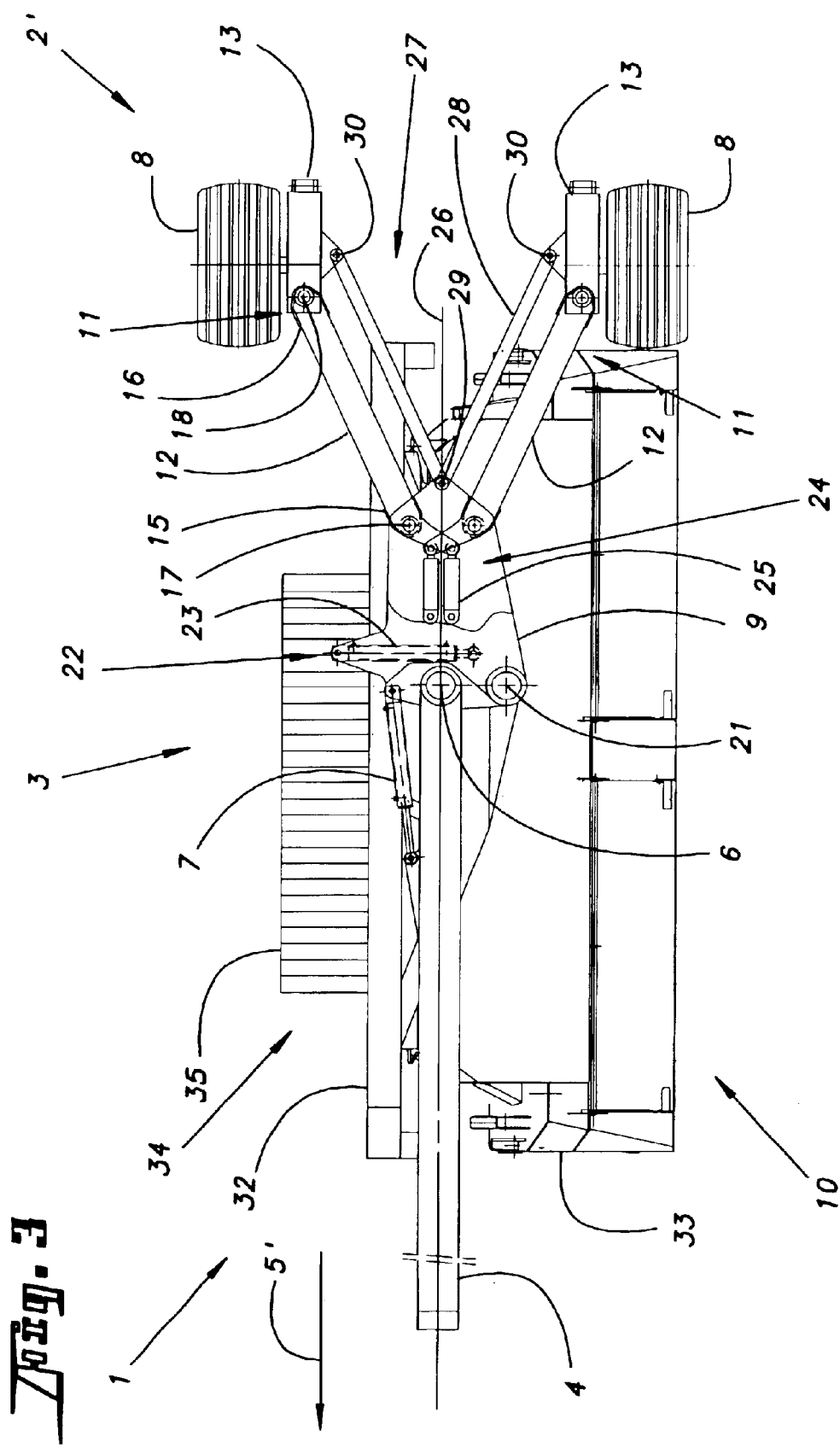
FIG. 3 depicts a top view of the machine of FIG. 1 in the transport position.

The agricultural machine 1 according to the present invention and depicted in the figures is intended to be hitched to a tractor (not depicted) for transport and for work. FIG. 1 depicts the agricultural machine 1 in a transport position 2'; in particular it comprises a body 3 and a drawbar 4. Said drawbar 4 is provided at its front part with a hitching device known to those skilled in the art. Said drawbar 4 is used to move the agricultural machine 1 along in the direction of forward travel for transport indicated by the arrow 5'. FIG. 2 depicts the agricultural machine 1 in a work position 2. In this work position 2, the tractor drives the agricultural machine 1 in the direction of travel for work indicated by the arrow 5. The drawbar 4 has a rear end which is mounted to pivot on said body 3 by means of a first articulation 6 with a substantially vertical axis.

In the remainder of the description, the ideas of "front" and "rear", "in front of" and "behind" are defined with respect to the direction of forward travel in work 5 and the ideas of "right" and "left" are defined when viewing said agricultural machine 1 from the rear in the direction of forward travel during work 5.

In the exemplary embodiment depicted in FIG. 3, said drawbar 4 is arranged substantially parallel to the direction of forward travel during transport 5', and said agricultural machine 1 is thus placed in the continuation of said tractor. Said body 3 is preferably arranged more or less in continuation of the drawbar 4. This configuration corresponds to the transport position 2' of said agricultural machine 1. The orientation of said drawbar 4 with respect to said body 3 is advantageously adjustable by means of a positioning ram 7. Said positioning ram 7 is arranged between said body 3 and said drawbar 4. In the transport position 2', the positioning ram 7 is positioned in an intermediate travel.

The body 3 of the agricultural machine 1 rests on the ground by means of wheels 8 and comprises a central unit 9 and a working unit 10. In transport, the working unit 10 is arranged parallel to the direction of forward travel during transport 5'. As a preference, in the transport position 2', said wheels 8 are arranged at the rear of the working unit 10. Each wheel 8 is connected to the central unit 9 by a corresponding connecting means 11. The connecting means 11 are advantageously connected to the rear part of the central unit 9. Each connecting means 11 consists of an articulated connecting rod 12 and of a wheel-bearing structure 13. Said wheel-bearing structure 13 is equipped with a wheel arm 14 which allows the corresponding wheel 8 to be moved in a substantially horizontal plane. Said articulated connecting rod 12 has a first end 15 and a second end 16. The first end 15 is connected to the central unit 9 by means of a third articulation 17 with a substantially vertical axis. Said second end 16 is connected to said wheel-bearing structure 13 by means of a fourth articulation 18 with a substantially vertical axis. The axes of said third articulation 17 and of said fourth articulation 18 are substantially parallel and are located in the rear part of the central unit 9. As can be seen from FIGS. 1 and 2, said wheel arm 14 is connected to said wheel-bearing structure 13 by means of a fifth articulation 19 with a substantially horizontal axis. Between said wheel-bearing structure 13 and said wheel arm 4 is arranged an operating ram 20 allowing heightwise adjustment of said agricultural machine 1 with respect to the ground. The agricultural machine 1 may, in combination with the known hitching device, thus be moved heightwise in a plane substantially parallel to the ground and which is substantially horizontal. For transport and for work, it is particularly beneficial to be able to adapt the height of the working unit 10 with respect to the surface of the ground. During transport, it is also particularly advantageous for said agricultural machine 1 to have a significant ground clearance, so as to negotiate obstacles.

Figure 4:
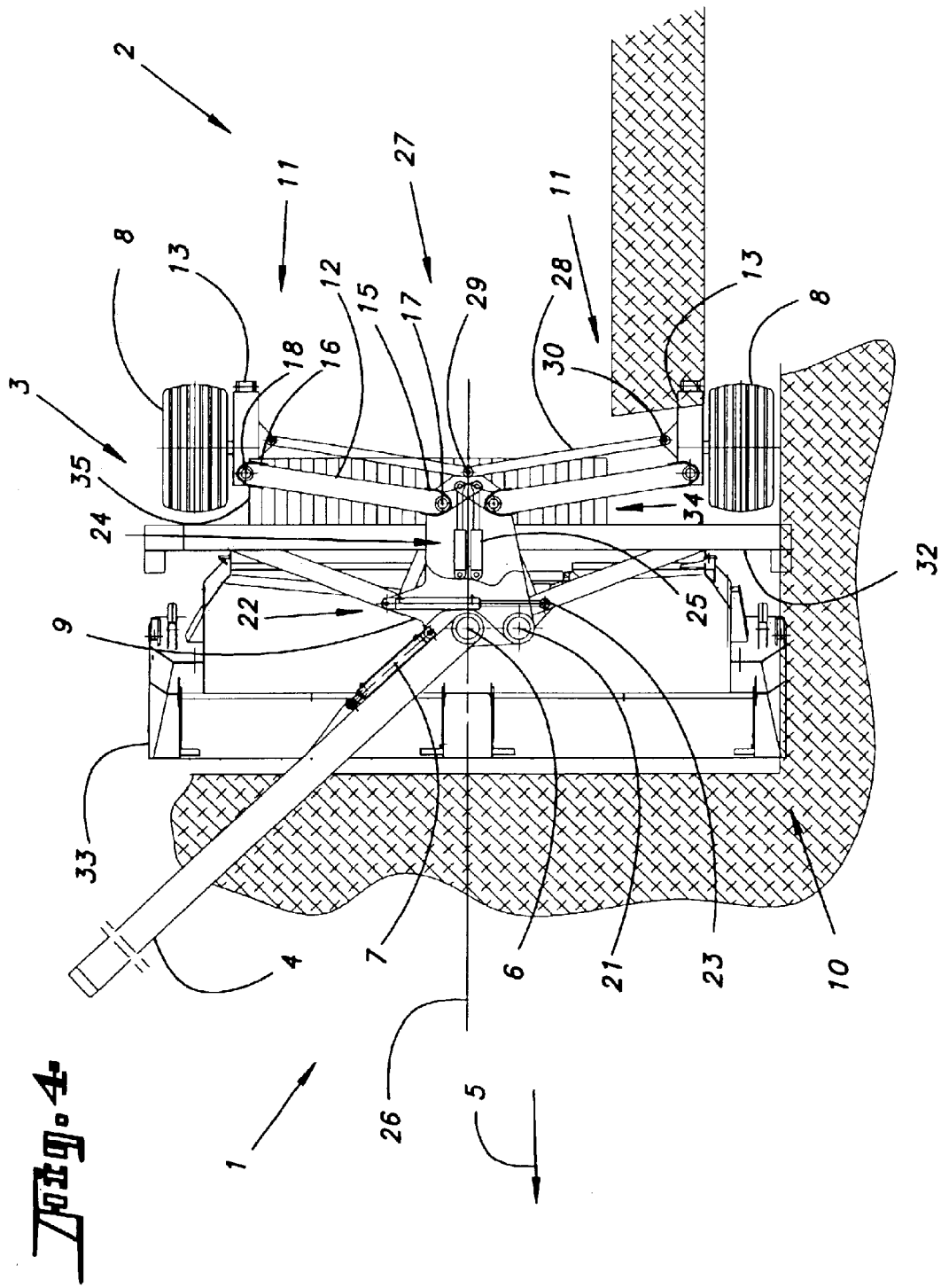
FIG. 4 depicts a top view of the machine of FIG. 2 in a first work position.

During work according to the exemplary embodiment depicted in FIG. 4, the working unit 10 is arranged, on one hand, transversely to the direction of forward travel 5 and, on another hand, with a lateral offset relative to the tractor. Said first articulation 6 allows said agricultural machine 1 to be offset to the right or to the left relative to the tractor by means of said positioning ram 7. The positioning ram 7 also allows the agricultural machine 1 to be moved from a work position 2 in which the working unit 10 is laterally offset with respect to said tractor into a transport position 2' in which the working unit 10 lies more or less in the continuation of the tractor.

In the work position 2, said wheels 8 advantageously extend behind the working unit 10 given the direction of forward travel 5. The agricultural machine 1 according to the invention preferably comprises two wheels 8. According to FIG. 4, said wheels 8 are distant from one another in such a way that the centre of gravity of the agricultural machine 1 is situated correctly inside the sustentation triangle formed by said wheels 8 and the point at which the drawbar 4 rests on the tractor. This remote position of said wheels 8 gives said agricultural machine 1 good stability during work. Since the working width of this agricultural machine 1 is great and even greater than the transport width allowed for traffic by road, it is inconceivable for this agricultural machine 1 to be transported in the work position 2.

According to an important feature of the present invention, the working unit 10 is connected to the central unit 9 by means of a second articulation 21 with a substantially vertical axis. Said first articulation 6 and said second articulation 21 are advantageously connected to the front part of the central unit 9. The axis of said second articulation 21 is preferably parallel to the axis of said first articulation 6. For transport, it is particularly advantageous to be able to pivot the working unit 10 with respect to the central unit 9 about said second articulation 21, using a working-unit-orientation mechanism 22. Thus, the bulk of said agricultural machine 1 for transport complies with the regulatory gauge width for traffic on the public highway. As visible in FIG. 3, the working unit 10 thus lies more or less under the drawbar 4. Said working-unit-orientation mechanism 22 in particular comprises a working-unit-orientation ram 23 which is connected, on one hand, to the working unit 10 and, on another hand, to the central unit 9. Said working-unit-orientation ram 23 is retracted during transport whereas, during work, said working-unit-orientation ram 23 is extended.

As a preference, each connecting rod 12 is orientated with respect to the central unit 9 by means of a connecting-rod-orientation mechanism 24. The connecting-rod-orientation mechanism 24 advantageously comprises a connecting-rod-orientation ram 25. Said connecting-rod-orientation ram 25 is connected, on one hand, to the central unit 9 and, on another hand, to said corresponding connecting rod 12. Said connecting-rod-orientation ram 25 makes it possible to control the angular travel of said corresponding connecting rod 12 about said third articulation 17. In the figures, said wheels 8 are placed one on each side of a vertical mid-plane 26 of the body 3 of said agricultural machine 1. Said vertical mid-plane 26 preferably passes through the axis of said first articulation 6. FIG. 4 shows that, during work, said wheels 8 are separated from one another by the action of said connecting-rod-orientation rams 25 which are completely extended. By contrast, for transport, according to FIG. 3, said wheels 8 lie more or less in the continuation of the working unit 10 so as not to exceed the road-going gauge width of three meters and are therefore brought closer together. In the transport position 2', said connecting-rod-orientation rams 25 are retracted. Said wheels 8 are relatively closer to said vertical mid-plane 26. Advantageously, said connecting-rod-orientation rams 25 are advantageously coupled together, thus allowing the connecting rods 12 to perform the same movement and thus be symmetrical with respect to said vertical mid-plane 26.

In order to move said agricultural machine 1 from a work position 2 to a transport position 2' and vice versa, it is absolutely essential for the lengths of certain elementary parts of the agricultural machine 1 to be suitable. Thus, the length of said connecting rods 12 needs to be at least substantially equal to half the width of the working unit 10. The length of the drawbar 4 is such that the working unit 10 can pivot about said second articulation 21 and that the working unit 10 can be arranged laterally with respect to the tractor. For clarity, the drawbar 4 is depicted only partially in FIGS. 3, 4 and 5. For reasons of stability, particularly during transport, it is perfectly possible to envision the use of a telescopic drawbar.

According to another important feature of the present invention, said wheels 8 are used during work and during transport. In consequence, it is necessary for the wheels to be steered so as to promote maneuverability during the switch from a work position 2 to the transport position 2' and vice versa. For that purpose, the wheel-bearing structure 13 of each wheel 8 comprises a wheel-bearing-structure-orientation mechanism 27.

FIGS. 3 and 4 show that the wheel-bearing-structure-orientation mechanism 27 comprises, in addition to the articulated connecting rod 12, a wheel-bearing-structure-orientation connecting rod 28. Said wheel-bearing-structure-orientation connecting rod 28 is connected, on one hand, to the central unit 9 by means of a sixth articulation 29 with a substantially vertical axis and, on another hand, to the wheel-bearing structure 13 by means of a seventh articulation 30 with a substantially vertical axis. The axis of the sixth articulation 29 is substantially parallel to the axis of the seventh articulation 30. As a preference, the axis of the third articulation 17, the axis of the fourth articulation 18, the axis of the sixth articulation 29 and the axis of the seventh articulation 30 of each wheel 8 are substantially parallel. Said third articulation 17, said fourth articulation 18, said sixth articulation 29 and said seventh articulation 30 of each wheel 8 advantageously form a parallelogram. The orientation of each wheel 8 is performed simultaneously with the orientation of said respective connecting rod 12 controlled by said respective connecting-rod-orientation ram 25. Each wheel 8 can thus be moved in a substantially vertical plane passing through said fourth articulation 18. Advantageously, the two wheel-bearing-structure-orientation connecting rods 28 may have a common sixth articulation 29 the axis of which would be substantially coincident with said vertical mid-plane 26.

FIG. 5 shows another exemplary embodiment of an agricultural machine 100 according to the invention. This agricultural machine 100 comprises the same constituent elements as the agricultural machine 1 of the previous embodiment. As a result, these elements will not be described again. The difference between these two exemplary embodiments lies in the mechanism 270 for orientating the bearing structure. In order to orientate the wheels 8 of this other exemplary embodiment, said wheel-bearing-structure-orientation mechanism 270 comprises a wheel-bearing-structure-orientation ram 310. This wheel-bearing-structure-orientation ram 310 is located between said wheel-bearing structure 13 and said connecting rod 12. Said wheel-bearing-structure-orientation ram 310 thus allows the corresponding wheel 8 to be moved in a substantially vertical plane passing through said fourth articulation 18. As a preference, said connecting-rod-orientation ram 25 and said wheel-bearing-structure-orientation ram 310 are coupled and thus perform identical movements. In another approach, it is entirely possible to operate each connecting-rod-orientation ram 25 and each wheel-bearing-structure-orientation ram 310 separately.

As depicted in the figures, the working unit 10 has a chassis 32 which is connected to the central unit 9 by means of said second articulation 21. Said chassis 32 pivots with respect to the central unit 9 about said second articulation 21 to pass from a work position 2 to a transport position 2' and vice versa. Said agricultural machine 1; 100 depicted in the exemplary embodiments in the figures corresponds to a harvesting machine.

This harvesting machine comprises, as a preference, a cutting mechanism 33 connected to said chassis 32 by means of a suspension device known to those skilled in the art. The suspension device allows the said cutting mechanism 33 to follow the unevenness of the ground independently of said chassis 32. Said cutting mechanism 33 is depicted in simplified form in the figures and is driven by transmission elements known to those skilled in the art. Such a cutting mechanism 33 is known to those skilled in the art and will therefore not be described further.

In FIG. 4, the positioning ram 7 is retracted, and so the harvesting machine is offset to the left-hand side of the tractor so that it does not run over the forage that is to be cut. When said harvesting machine is working, the cutting mechanism 33 glides over the ground and cuts the forage. The latter is transmitted to a forage treatment device (not depicted) produced in the form of a rotor which breaks up the outer film of the forage to accelerate its drying. As such a forage treatment device is within the competence of the person skilled in the art, it has not been depicted in the figures and will not be described further.

In a way also known to the person skilled in the art, said harvesting machine additionally comprises a device allowing the forage to be moved transversely to the direction of forward travel during work 5. This device preferably consists of a grouping device 34 for grouping the forage into a windrow using a conveyor belt 35. Said conveyor belt 35 is preferably arranged directly behind the conditioning mechanism so as to avoid any loss of forage. According to FIG. 4, the forage is transported via the conveyor belt 35 and deposited on the left-hand side of the cutting mechanism 33. As the wheels 8 are separated from one another by their maximum amount in the work position 2, the space thus created favors the use of said grouping device 34.

When such a harvesting machine is being used, it is the common practice to work back and forth along a lot of land. FIG. 5 depicts another work position 200 in which said positioning ram 7 is extended so that the cutting mechanism 33 moves to the right-hand side of said tractor. In FIG. 5, the agricultural machine 100 moves in the other direction of work 500. Operation of the positioning ram 7 simultaneously causes said conveyor belt 35 to move. In a particularly advantageous way, in this second work position 200, one of said wheels 8 moves somewhat closer to said vertical mid-plane 26 and therefore moves closer to the other wheel 8. Said wheel 8 is positioned in such a way as not to impede said movement of forage to the right-hand side so as to group two successive windrows as close together as possible. The grouping-together of these two successive windrows is ideally suited to known pick-ups. In addition, these windrows are not piled up on top of each other, in order to allow more rapid drying. In this other exemplary embodiment, each connecting-rod-orientation ram 25 is driven individually so as to obtain, with respect to the vertical mid-plane 26, an asymmetric orientation of said connecting rods 12.

As a preference, the control of the various rams 7, 20, 23, 25, 310 of said agricultural machine 1; 100 is combined so as to be able to perform an automatic switch from the work position 2; 200 to the transport position 2' and vice versa or alternatively from one work position 2; 200 to another work position 200; 2. The various rams 7, 20, 23, 25, 310 are advantageously of the double-acting type.

Obviously, the invention is not restricted to the embodiment described and depicted in the appended drawings. Modifications remain possible, particularly as regards the construction of the various elements or by substituting technical equivalents, without thereby departing from the field of protection as defined in the claims.

Thus, it is entirely possible, for the working unit 10 to comprise some other type of haymaking machine or alternatively a soil-working machine.

It is also conceivable for the connecting-rod-orientation mechanism 24 to be produced mechanically. For this, the first ends 15 of each connecting rod 12 are intended to come into contact with one another and to form gearing allowing said connecting rods 12 to be orientated about the third articulation 17. Said connecting rods 12 are orientated synchronously. It is also conceivable for the second ends 16 to form, with said corresponding wheel-bearing structure 13, gearing allowing said wheels 8 to be orientated about the fourth articulation 18.

It is also conceivable for the axis of said first articulation 6 and the axis of said second articulation 21 to be substantially coincident. Said first articulation 6 and said second articulation 21 are advantageously superposed to allow the working unit 10 to be brought into a work position 2; 200 or into a transport position 2' with respect to the central unit 9.

It is also conceivable for the harvesting machine to be equipped not with a grouping device 34 but with a device consisting of deflectors known to those skilled in the art. The deflectors advantageously allow the formation of a central windrow. According to another alternative form, said harvesting machine may also spread the forage across the entire working width. The wider spreading is achieved, as a preference, by omitting or raising the windrow-grouping device 34 or the deflectors.

The body 3 of the agricultural machine 1; 100 rests on the ground by means of single wheels 8 or of multiple wheels.

What is claimed as new and desired to be secured by Letters Patent of the United States is:

1. Agricultural machine including a body and a drawbar, the drawbar being connected to said body by means of a first articulation with a substantially vertical axis and allowing said agricultural machine to be moved along during work and during transport, said body resting on the ground during work using wheels each wheel being connected to said body via a connecting means, said body comprising a central unit and a working unit, the working unit being arranged transversely to the direction of forward travel for work and is arranged substantially parallel to the direction of forward travel for transport, wherein the working unit is connected to the central unit using a second articulation with a substantially vertical axis so that the working unit can be brought into a work position or into a transport position with respect to said central unit, and wherein said connecting means allows the corresponding wheel to be moved away from or closer to a vertical mid-plane of said body, said wheels being used during work and during transport, wherein said connecting means includes an articulated connecting rod and is connected to the rear part of the central unit, wherein a first end of each connecting rod is connected to the central unit using a third articulation with a substantially vertical axis.

2. Machine as claimed in claim 1, wherein an angular orientation of each connecting rod with respect to the central unit is achieved by a connecting-rod-orientation mechanism.

3. Machine as claimed in claim 1, wherein said connecting-rod-orientation mechanism includes at least one connecting-rod-orientation ram.

4. Machine as claimed in claim 1, wherein each connecting rod can be orientated separately.

5. Machine as claimed in claim 1, wherein at least one connecting rod connects to the central unit and to the wheel via a wheel bearing structure and wherein the length of the at least one connecting rod is appreciably shorter than half the length of the working unit.

6. Machine as claimed in claim 1, wherein said vertical mid-plane passes substantially through the axis of said first articulation.

7. Machine as claimed in claim 1, wherein the working unit comprises a chassis connected to the central unit using the second articulation so that, in order to move from a work position to a transport position and vice versa, said chassis pivots with respect to the central unit about the axis of said second articulation.

8. Machine as claimed in claim 1, wherein said working unit is brought into its work position and into its transport position using a working-unit-orientation mechanism.

9. Machine as claimed in claim 1 wherein said machine is a harvesting machine.

10. Machine as claimed in claim 9, wherein said harvesting machine includes a device allowing the forage to be moved transversely to the direction of forward travel during work.

11. Machine as claimed in claim 10, wherein said device includes a grouping device.

12. Machine as claimed in claim 11, wherein said grouping device includes at least one conveyor belt.

13. Machine as claimed in claim 10, wherein the wheel situated on the side toward which the forage is moved is positioned in such a way as not to impede said movement.

14. Machine as claimed in claim 1, wherein the wheels are located at the rear of the working unit.

15. Machine as claimed in claim 1, wherein said working unit is brought into its work position or into its transport position using a working-unit-orientation mechanism.

16. Agricultural machine including a body and a drawbar, the drawbar being connected to said body by means of a first articulation with a substantially vertical axis and allowing said agricultural machine to be moved along during work and during transport, said body resting on the ground during work using wheels each wheel being connected to said body via a connecting means, said body comprising a central unit and a working unit, the working unit being arranged transversely to the direction of forward travel for work and is arranged substantially parallel to the direction of forward travel for transport, wherein the working unit is connected to the central unit using a second articulation with a substantially vertical axis so that the working unit can be brought into a work position or into a transport position with respect to said central unit, and wherein said connecting means allows the corresponding wheel to be moved away from or closer to a vertical mid-plane of said body, said wheels being used during work and during transport, wherein said connecting means includes an articulated connecting rod and is connected to the rear part of the central unit, wherein the wheels are connected to a second end of the respective connecting rod via a wheel bearing structure, the wheel bearing structure being connected to said second end using a fourth articulation with a substantially vertical axis.

17. Machine as claimed in claim 16, wherein an angular orientation of each wheel bearing structure with respect to the corresponding connecting rod is achieved by a wheel-bearing-structure-orientation mechanism.

18. Machine as claimed in claim 17, wherein said wheel-bearing-structure-orientation mechanism includes a wheel-bearing-structure-orientation ram.

19. Machine as claimed in claim 17, wherein said wheel-bearing-structure-orientation mechanism includes a wheel-bearing-structure-orientation connecting rod, the wheel-bearing-structure-orientation connecting rod forming substantially a parallelogram with the corresponding connecting rod.

20. Agricultural machine including a body and a drawbar, the drawbar being connected to said body by means of a first articulation with a substantially vertical axis and allowing said agricultural machine to be moved along during work and during transport, said body resting on the ground during work using wheels each wheel being connected to said body via a connecting means, said body comprising a central unit and a working unit, the working unit being arranged transversely to the direction of forward travel for work and is arranged substantially parallel to the direction of forward travel for transport, wherein the working unit is connected to the central unit using a second articulation with a substantially vertical axis so that the working unit can be brought into a work position or into a transport position with respect to said central unit, and wherein said connecting means allows the corresponding wheel to be moved away from or closer to a vertical mid-plane of said body, said wheels being used during work and during transport, wherein said connecting means includes an articulated connecting rod and is connected to the rear part of the central unit, wherein an angular orientation of each connecting rod with respect to the central unit is achieved by a connecting-rod-orientation mechanism, wherein said connecting-rod-orientation mechanism includes at least one connecting-rod-orientation ram, wherein said connecting-rod-orientation ram and a corresponding wheel-bearing-structure-orientation ram are coupled.

21. Machine as claimed in claim 20, wherein said connecting-rod-orientation ram and said corresponding wheel-bearing-structure-orientation ram are coupled in series.

22. Agricultural machine including a body and a drawbar, the drawbar being connected to said body by means of a first articulation with a substantially vertical axis and allowing said agricultural machine to be moved along during work and during transport, said body resting on the ground during work using wheels each wheel being connected to said body via a connecting means, said body comprising a central unit and a working unit, the working unit being arranged transversely to the direction of forward travel for work and is arranged substantially parallel to the direction of forward travel for transport, wherein the working unit is connected to the central unit using a second articulation with a substantially vertical axis so that the working unit can be brought into a work position or into a transport position with respect to said central unit, and wherein said connecting means allows the corresponding wheel to be moved away from or closer to a vertical mid-plane of said body, said wheels being used during work and during transport, wherein the axis of the first articulation and the axis of the second articulation are substantially coincident.

23. Agricultural machine including a body and a drawbar, the drawbar being connected to said body by means of a first articulation with a substantially vertical axis and allowing said agricultural machine to be moved along during work and during transport, said body resting on the ground during work using wheels each wheel being connected to said body via a connecting means, said body comprising a central unit and a working unit, the working unit being arranged transversely to the direction of forward travel for work and is arranged substantially parallel to the direction of forward travel for transport, wherein the working unit is connected to the central unit using a second articulation with a substantially vertical axis so that the working unit can be brought into a work position or into a transport position with respect to said central unit, and wherein said connecting means allows the corresponding wheel to be moved away from or closer to a vertical mid-plane of said body, said wheels being used during work and during transport, wherein said working unit is brought into its work position and into its transport position using a working-unit-orientation mechanism, wherein said working-unit-orientation mechanism includes a working-unit-orientation ram.

24. Agricultural machine including a body and a drawbar, the drawbar being connected to said body by means of a first articulation with a substantially vertical axis and allowing said agricultural machine to be moved along during work and during transport, said body resting on the ground during work using wheels each wheel being connected to said body via a connecting means, said body comprising a central unit and a working unit, the working unit being arranged transversely to the direction of forward travel for work and is arranged substantially parallel to the direction of forward travel for transport, wherein the working unit is connected to the central unit using a second articulation with a substantially vertical axis so that the working unit can be brought into a work position or into a transport position with respect to said central unit, and wherein said connecting means allows the corresponding wheel to be moved away from or closer to a vertical mid-plane of said body, said wheels being used during work and during transport, wherein said connecting means includes an articulated connecting rod and is connected to the rear part of the central unit, wherein an angular orientation of each connecting rod with respect to the central unit is achieved by a connecting-rod-orientation mechanism, wherein said connecting-rod-orientation mechanism includes at least one connecting-rod-orientation ram, wherein said connecting-rod-orientation rams and the working-unit-orientation ram are coupled.

25. Machine as claimed in claim 24, where in said connecting-rod-orientation rams and said working-unit-orientation ram are coupled in series.

26. Agricultural machine including a body and a drawbar, the drawbar being connected to said body by means of a first articulation with a substantially vertical axis and allowing said agricultural machine to be moved along during work and during transport, said body resting on the ground during work using wheels each wheel being connected to said body via a connecting means, said body comprising a central unit and a working unit, the working unit being arranged transversely to the direction of forward travel for work and is arranged substantially parallel to the direction of forward travel for transport, wherein the working unit is connected to the central unit using a second articulation with a substantially vertical axis so that the working unit can be brought into a work position or into a transport position with respect to said central unit, and wherein said connecting means allows the corresponding wheel to be moved away from or closer to a vertical mid-plane of said body, said wheels being used during work and during transport, wherein said first articulation and said second articulation are connected to the front part of the central unit.

\* \* \* \* \*